United States Patent
Seemann et al.

(10) Patent No.: US 12,502,239 B2
(45) Date of Patent: Dec. 23, 2025

(54) SHRINK STERILE DRAPE AND RELATED SYSTEMS AND METHODS

(71) Applicant: Mazor Robotics Ltd., Caesarea (IL)

(72) Inventors: Ziv Seemann, Beit Ytzhack (IL); Amir Keret, Atlit (IL); Adi Sandelson, Givatayim (IL)

(73) Assignee: Mazor Robotics Ltd., Caesarea (IL)

( * ) Notice: Subject to any disclaimer, the term of this patent is extended or adjusted under 35 U.S.C. 154(b) by 884 days.

(21) Appl. No.: 17/589,991

(22) Filed: Feb. 1, 2022

(65) Prior Publication Data

US 2022/0273386 A1    Sep. 1, 2022

Related U.S. Application Data

(60) Provisional application No. 63/155,149, filed on Mar. 1, 2021.

(51) Int. Cl.
| | | |
|---|---|---|
| A61B 46/10 | (2016.01) | |
| A61B 34/20 | (2016.01) | |
| A61B 34/30 | (2016.01) | |
| A61B 46/00 | (2016.01) | |

(52) U.S. Cl.
CPC ............ *A61B 46/10* (2016.02); *A61B 34/20* (2016.02); *A61B 34/30* (2016.02); *A61B 46/40* (2016.02); *A61B 2034/2065* (2016.02)

(58) Field of Classification Search
CPC .... A61B 2034/2051; A61B 2034/2055; A61B 2034/2065; A61B 2090/371; A61B 2090/3735; A61B 2090/374; A61B 2090/376; A61B 2090/3762; A61B 2090/3784; A61B 34/20; A61B 34/30; A61B 46/10; A61B 46/40; A61B 90/37
See application file for complete search history.

(56) References Cited

U.S. PATENT DOCUMENTS

| | | | |
|---|---|---|---|
| 3,796,477 | A | 3/1974 | Geraci |
| 5,792,045 | A | 8/1998 | Adair |
| 6,318,864 | B1 * | 11/2001 | Fukaya ................. A61B 46/10 |
| | | | 359/368 |
| 7,366,562 | B2 | 4/2008 | Dukesherer et al. |
| 8,083,667 | B2 | 12/2011 | Cooper et al. |
| 8,623,276 | B2 | 1/2014 | Schmaltz et al. |
| 9,486,196 | B1 | 11/2016 | Heaton, II et al. |
| 10,617,289 | B2 | 4/2020 | Gomez et al. |
| 2001/0056221 | A1 | 12/2001 | Verschuur |
| 2011/0277775 | A1 | 11/2011 | Holop et al. |
| 2015/0114404 | A1 | 4/2015 | Czop et al. |
| 2020/0054299 | A1 | 2/2020 | Daley, II et al. |
| 2020/0054409 | A1 | 2/2020 | Stanton et al. |

OTHER PUBLICATIONS

International Search Report and Written Opinion for International (PCT) Patent Application No. PCT/IL2022/050220, dated May 12, 2022, 16 pages.
Extended Search Report for European Patent Application No. 25198638.6, dated Nov. 10, 2025, 7 pages.

* cited by examiner

*Primary Examiner* — Scott Luan
(74) *Attorney, Agent, or Firm* — Sheridan Ross P.C.

(57) ABSTRACT

A shrink sterile drape according to at least one embodiment of the present disclosure includes a first portion; a second portion configured to shrink relative to the first portion in the presence of heat; and an optical window disposed in the second portion and configured to permit passage of light therethrough.

20 Claims, 4 Drawing Sheets

SHRINK STERILE DRAPE AND RELATED SYSTEMS AND METHODS

CROSS REFERENCE TO RELATED APPLICATIONS

This application claims priority to and the benefit of U.S. Provisional Application No. 63/155,149, filed Mar. 1, 2021, entitled "Systems and Methods for Applying a Shrinkable Sterile Drape". The entire disclosure of the application listed above is hereby incorporated herein by reference, in its entirety, for all that it teaches and for all purposes.

FIELD

The present technology generally relates to surgical devices and procedures, and relates more particularly to surgical drapes.

BACKGROUND

Surgical robots may assist a surgeon or other medical provider in carrying out a surgical procedure, or may complete one or more surgical procedures autonomously. Surgical robots may comprise coverings to keep the robot clean during the surgical procedure. Other tools in an operating room, including but not limited to imaging devices may also require surgical coverings. The surgical coverings may be sterile to protect a patient undergoing surgery and may be designed to be disposable or replaced at regular intervals (such that the covering is not a permanent part of the tools they protect).

SUMMARY

Example aspects of the present disclosure include:

A shrink sterile drape according to at least one embodiment of the present disclosure comprises a first portion; a second portion configured to shrink relative to the first portion in the presence of heat; and an optical window disposed in the second portion and configured to permit passage of light therethrough.

Any of the aspects herein, wherein the drape is configured to cover at least a portion of a medical apparatus.

Any of the aspects herein, wherein the surgical robot comprises an O-arm or a robotic arm.

Any of the aspects herein, wherein, when the second portion receives heat, the second portion shrinks onto and substantially conforms to a surface of the surgical robot.

Any of the aspects herein, wherein the second portion comprises at least one of polyethylene, modified fluorinated ethylene propylene (FEP), oriented polystyrene, and polyolefin.

Any of the aspects herein, wherein the second portion is configured to shrink in at least one of a length direction and a width direction and expand in a thickness direction when receiving heat.

Any of the aspects herein, wherein the optical window is configured to shrink in at least one dimension when receiving heat.

Any of the aspects herein, wherein a medical apparatus comprises an imaging device, and wherein the optical window is aligned with the imaging device such that light received by the imaging device passes through the optical window.

Any of the aspects herein, wherein a robotic arm comprises at least one marker, and wherein the optical window is aligned with the at least one marker so that the at least one marker is visible through the optical window.

Any of the aspects herein, wherein at least one marker is disposed on a raised stage of the robotic arm.

A system according to at least one embodiment of the present disclosure comprises a robotic arm; and a sterilized sheet configured cover at least part of the robotic arm, the sheet comprising: a first portion comprising a non-heat-shrinkable material; a second portion comprising a heat-shrinkable material; and an optical window disposed in the second portion and configured to permit the passage of light therethrough.

Any of the aspects herein, wherein the sterilized sheet covers at least a portion of the robotic arm.

Any of the aspects herein, wherein the optical window is aligned with an imaging device such that light received by the imaging device passes through the optical window.

Any of the aspects herein, wherein the optical window is configured to shrink around an imaging device such that the optical window does not move with respect to the imaging device.

Any of the aspects herein, wherein the second portion comprises at least one of polyethylene, modified fluorinated ethylene propylene (FEP), oriented polystyrene, and polyolefin.

Any of the aspects herein, wherein the robotic arm comprises a heat source configured to apply heat to the second portion.

Any of the aspects herein, wherein the heat source comprises a heated ring.

Any of the aspects herein, wherein the heated ring surrounds at least one of a marker and an imaging device disposed on the robotic arm.

A surgical drape according to at least one embodiment of the present disclosure comprises a first material configured to cover a first portion of a surgical tool; and a second material configured to cover a second portion of the surgical tool, the second portion comprising a light-based element and the second material is a heat-shrinkable material, wherein each of the first material and the second material may be chemically sterilized.

Any of the aspects herein, wherein the light-based element comprises a lens of an imaging device.

Any of the aspects herein, wherein the light-based element comprises a marker.

Any of the aspects herein, wherein the second material is configured to provide a smooth, transparent protective barrier over the light-based element following application of heat thereto.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
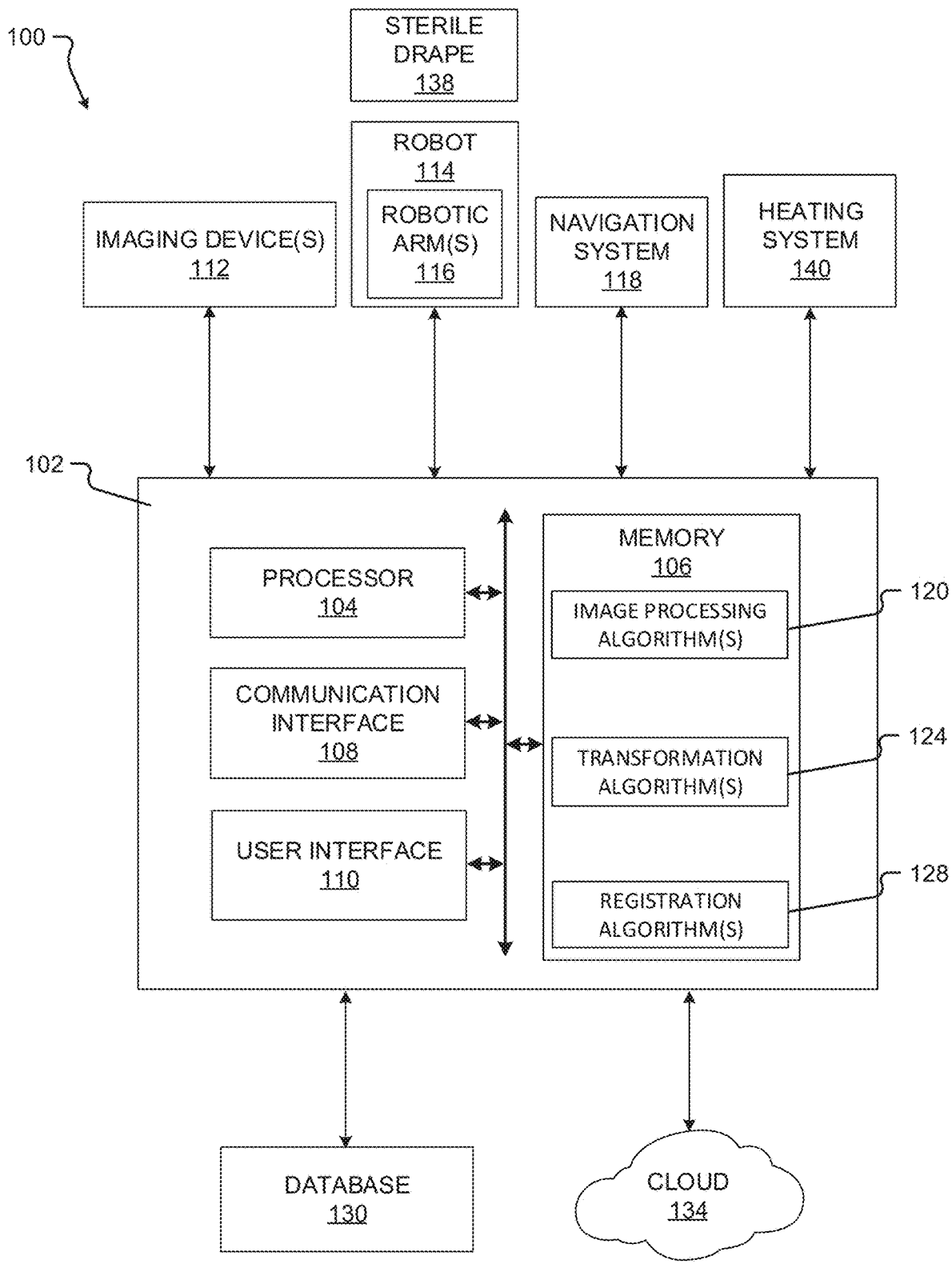
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Surgical robots, imaging devices, and other surgical tools (e.g., microscopes, biopsy devices, navigation systems, cutting tools) may comprise one or more lenses through which images are taken, and/or one or more active markers (e.g., LEDs, IREDs) that enable a navigation system to track a position in space of such robots, imaging devices, and/or other tools. However, such devices may require a sterile covering to be placed thereon so as to preserve the sterile environment of the operating room and protect patients from infection or disease. Sterile surgical drapes, for example, may be used to cover a surgical robot, imaging device, and/or other surgical tool in an operating room. Such drapes may fit only loosely over the robot, imaging device, and/or tool, however, with the drapes wrinkles, folds, and/or other contours distorting light passing therethrough. As a result, images captured by an imaging device through such a drape may be distorted, and an external sensor may be unable to detect distorted light signals emitted or reflected by active markers (e.g., LED or IRED markers) and/or passive markers (e.g., a retro-reflective lens such as Radix™) inside (or at least on an opposite side) of the covering. To address this issue, sterile coverings may be provided with one or more rigid optical windows, positioned such that when the covering is installed in a precise pose over the robot, imaging device, or surgical tool, the optical window(s) is/are positioned over any imaging device lenses, active markers, and/or other optical elements.

Placing coverings with optical windows on a tool or system (e.g., a robot, an imaging device) such that the optical windows align with optical elements of a tool or system (e.g., a camera lens, one or more active and/or passive markers), however, is a task that requires manual labor in an operating room (OR), and the outcome or success of the placement may be sensitive to user expertise. According to embodiments of the present disclosure, placing a drape such that an optical window of the drape is fixed in place relative to an optical element of the robot or tool may help reduce issues associated with covering an optical element, such as user error and/or intraoperative movement.

According to embodiments of the present disclosure, a shrink portion or sleeve may be added to a drape at selected locations. A drape according to embodiments of the present disclosure may be sterilized without heat and has one or more optical windows therein that shrink when heat is applied. The drape may be placed on a robot or other surgical tool, after which heat may be applied to shrink the drape. The heat may be supplied, for example, by a heat gun, or by a heating element built into or otherwise attached to the robot or surgical tool. One or more portions of the drape may be shrunk to fix an optical window in place and prevent movement thereof. The shrink portion or sleeve may be transparent, such that light is capable of passing through the shrink portion or sleeve (and, e.g., enabling an image to be taking by an imaging device through the covering, and/or enabling an LED, IRED, or other light-emitting marker to be visible to a sensor positioned on an opposite side of the covering). The shrink portion or sleeve may be used to fix an optical window in the covering over an optical element (e.g., a camera lens on a robot-supported imaging device) and may have different degrees of optical clarity.

A shrink portion or sleeve according to embodiments of the present disclosure may be applied, for example, to an O-arm, so that the portion of the drape or other covering comprising the shrink portion or sleeve that covers one or more markers and/or lenses on the O-arm is smooth and will cause less optical (or other) distortion than would a wrinkled section of covering. During installation, the drape may be placed over the O-arm, and heat may be applied to one or more heat-shrinkable portions of the drape so as to cause such portions of the drape to shrink over elements of the O-arm (whether LEDs, IREDs, lenses, or otherwise) that require a smooth covering.

Embodiments of the present disclosure provide technical solutions to one or more of the problems of optical signal distortion through surgical drapes and other sterile coverings, user error introduced when applying a drape to a surgical instrument or robot, undesired optical window movement during surgery, and/or interference of a surgical drape or other sterile covering with surgical procedures.

Turning first to FIG. 1, a block diagram of a system 100 according to at least one embodiment of the present disclosure is shown. The system 100 may be used to conduct or assist a user (e.g., a surgeon) in conducting or performing a surgery or surgical procedure by facilitating the placement and/or adherence of a sterile drape to a surgical robot, imaging device, surgical tool, and/or one or more components of any of the foregoing; and/or to carry out one or more other aspects of any method disclosed herein. The system 100 comprises a computing device 102, one or more imaging devices 112, a robot 114, a navigation system 118, a database 130, a cloud or other network 134, a sterile drape 138, and/or a heating system 140. Systems according to other embodiments of the present disclosure may comprise more or fewer components than the system 100. For example, the system 100 may not include the imaging device 112, the robot 114, the navigation system 118, one or more components of the computing device 102, the database 130, the cloud 134, and/or the heating system 140.

The computing device 102 comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging device 112, the robot 114, the navigation system 118, the database 130, and/or the cloud 134.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the method 200 described herein, or of any other methods. The memory 106 may store, for example, one or more image processing algorithms 120, one or more transformation algorithms 124, and/or one or more registration algorithms 128. Such instructions or algorithms may, in some embodiments, be organized into one or more applications, modules, packages, layers, or engines. The algorithms and/or instructions may cause the processor 104 to manipulate data stored in the memory 106 and/or received from or via the imaging device 112, the robot 114, the database 130, and/or the cloud 134.

The computing device 102 may also comprise a communication interface 108. The communication interface 108 may be used for receiving image data or other information from an external source (such as the imaging device 112, the robot 114, the navigation system 118, the database 130, the cloud 134, and/or any other system or component not part of the system 100), and/or for transmitting instructions, images, or other information to an external system or device (e.g., another computing device 102, the imaging device 112, the robot 114, the navigation system 118, the database 130, the cloud 134, and/or any other system or component not part of the system 100). The communication interface 108 may comprise one or more wired interfaces (e.g., a USB port, an ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 110 may be useful to allow a surgeon or other user to modify instructions to be executed by the processor 104 according to one or more embodiments of the present disclosure, and/or to modify or adjust a setting of other information displayed on the user interface 110 or corresponding thereto.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate one or more other components of the computing device 102, while in other embodiments, the user interface 110 may be located remotely from one or more other components of the computing device 102.

The imaging device 112 may be operable to image anatomical feature(s) (e.g., a bone, veins, tissue, etc.) and/or other aspects of patient anatomy to yield image data (e.g., image data depicting or corresponding to a bone, veins, tissue, etc.). "Image data" as used herein refers to the data generated or captured by an imaging device 112, including in a machine-readable form, a graphical/visual form, and in any other form. In various examples, the image data may comprise data corresponding to an anatomical feature of a patient, or to a portion thereof. The image data may be or comprise a preoperative image, an intraoperative image, a postoperative image, or an image taken independently of any surgical procedure. In some embodiments, a first imaging device 112 may be used to obtain first image data (e.g., a first image) at a first time, and a second imaging device 112 may be used to obtain second image data (e.g., a second image) at a second time after the first time. The imaging device 112 may be capable of taking a 2D image or a 3D image to yield the image data. The imaging device 112 may be or comprise, for example, an ultrasound scanner (which may comprise, for example, a physically separate transducer and receiver, or a single ultrasound transceiver); an O-arm, a C-arm, a G-arm, or any other device utilizing X-ray-based imaging (e.g., a fluoroscope, a CT scanner, or other X-ray machine), any of which may also comprise a physically separate emitter and detector; a magnetic resonance imaging (MRI) scanner; an optical coherence tomography (OCT) scanner; an endoscope; a microscope; an optical camera; a thermographic camera (e.g., an infrared camera); a radar system (which may comprise, for example, a transmitter, a receiver, a processor, and one or more antennae); or any other imaging device 112 suitable for obtaining images of an anatomical feature of a patient. The imaging device 112 may be contained entirely within a single housing, or may comprise a transmitter/emitter and a receiver/detector that are in separate housings or are otherwise physically separated.

In some embodiments, the imaging device 112 may comprise more than one imaging device 112. For example, a first imaging device may provide first image data and/or a first image, and a second imaging device may provide second image data and/or a second image. In still other embodiments, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The robot 114 may be any surgical robot or surgical robotic system. The robot 114 may be or comprise, for example, the Mazor X™ Stealth Edition robotic guidance system. The robot 114 may be configured to position the imaging device 112 at one or more precise position(s) and orientation(s), and/or to return the imaging device 112 to the same position(s) and orientation(s) at a later point in time. The robot 114 may additionally or alternatively be configured to manipulate and/or guide a surgical tool (whether based on guidance from the navigation system 118 or not) to accomplish or to assist with a surgical task. In some embodiments, the robot 114 may be configured to hold and/or manipulate an anatomical element during or in connection with a surgical procedure. The robot 114 may comprise one or more robotic arms 116. In some embodiments, the robotic arm 116 may comprise a first robotic arm and a second robotic arm, though the robot 114 may comprise more than two robotic arms. In some embodiments, one or more of the robotic arms 116 may be used to hold and/or maneuver the imaging device 112. In embodiments where the imaging device 112 comprises two or more physically separate components (e.g., a transmitter and receiver), one robotic arm 116 may hold one such component, and another robotic arm 116 may hold another such component. Each robotic arm 116 may be positionable independently of the other robotic arm. The robotic arms may be controlled in a single, shared coordinate space, or in separate coordinate spaces.

The robot 114, together with the robotic arm 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by the robotic arm 116) may be precisely positionable in one or more needed and specific positions and orientations.

The robotic arm(s) 116 may comprise one or more sensors that enable the processor 104 (or a processor of the robot 114) to determine a precise pose in space of the robotic arm (as well as any object or element held by or secured to the robotic arm).

In some embodiments, reference markers (i.e., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some embodiments, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example). The reference markers may be, for example, active markers that emit electromagnetic radiation detectable by a navigation system such as the navigation system 118. For example, the reference markers may be or comprise LEDs that emit light at visible wavelengths; infrared emitting devices (IREDs) that emit light at infrared wavelengths; or any other type of marker capable of emitting electromagnetic radiation.

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some embodiments, the navigation system may comprise one or more electromagnetic sensors. In various embodiments, the navigation system 118 may be used to track a position and orientation (i.e., pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. In some embodiments, the system 100 can operate without the use of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

The system 100 also comprises a sterile drape 138. The sterile drape 138 is a flexible sheet or other flexible structure (e.g., a flexible mesh, a blanket, etc.) configured to be placed on (e.g., draped over, positioned on, wrapped about, laid over, etc.) one or more components of the system 100 (e.g., the robotic system 114, the one or more robotic arms 116, combinations thereof, etc.). In at least one embodiment, the sterile drape 138 may be placed over certain portions or at specific locations of the robotic system 114 and/or components thereof. For example, the sterile drape 138 may cover the robotic arm 116 (or a portion thereof). The sterile drape 138 may reduce the risk of hazardous material contacting the one or more components over which the sterile drape 138 is placed, and/or of inadvertent contact with the one or more components over which the sterile drape 138 is placed. For example, the sterile drape 138 may form a barrier or protective layer between the one or more components and a patient during surgery or surgical procedure, which may prevent anatomical tissues (e.g., blood) and other external detritus (e.g., dirt, debris, dust, etc.) from contacting the one or more components, and may additionally or alternatively reduce the possibility of infection by preventing the one or more components from contacting anatomical tissue of the patient.

In some embodiments, the sterile drape 138 may comprise one or more portions made from various materials. For example, the sterile drape 138 may comprise a first portion made from a material resistant to shrinking when heat is applied and a second portion that is configured to shrink when heat is applied. In some embodiments, the first portion may be or comprise a heat-resistant material (e.g., wool, heat-resistant plastic, amorphous polymers, etc.) or any other material that does not change dimensionality or resists changes to dimensionality under the application of heat. The second portion may be a heat-shrinkable material (e.g., a material that may shrink when heat is applied) such as polyethylene, modified fluorinated ethylene propylene (FEP), oriented polystyrene, polyolefin, combinations thereof, and/or the like. The second portion may shrink (upon application of heat thereto) to conform to a surface of a surgical instrument or other component (e.g., the imaging device 112, the robot 114, the robotic arm 116, etc.). In some embodiments, the second portion may substantially conform to the underlying surface over which the sterile drape 138 is placed. In these embodiments, the second portion may accommodate sharp transitions in the underlying geometry of the component over which the sterile drape 138 has been placed. In any given surgical instrument, there may be regions where the dimensions of the surgical instrument quickly and/or drastically change, creating sharp transitions (in contrast to a smooth and/or continuous surface). For example, a robotic arm may include a fiducial marker (e.g., a reflective sphere) which may protrude from an outer surface of the robotic arm, creating a sharp transition along the surface of the robotic arm. In this example, when the sterile drape 138 is placed over the robotic arm, a second portion of the sterile drape 138 may be aligned such that the second portion is laid over the fiducial marker. The second portion may then, when heated, shrink to substantially conform to the fiducial marker.

In still other embodiments, the second portion may be configured to shrink around the fiducial marker without disrupting the functionality of the fiducial marker. For example, the fiducial marker may be elevated or otherwise distanced (e.g., using a small stage) from a primary surface of the device to which it is attached (e.g., to improve visibility of the marker). The small stage may secure the fiducial marker to a surgical tool or surgical device while also physically separating the fiducial marker therefrom (e.g., so that the fiducial marker does not rest on the surface of the surgical tool or surgical device). The second portion may be positioned proximate the small stage, such that when heat is applied to the second portion, the heat-shrinkable material of the second portion shrinks over the small stage and the fiducial marker thereon. This ensures that the drape or covering does not distort optical or other electromagnetic signals emitted by the marker, while also securing the drape in place over the surgical tool or other device.

The sterile drape 138 (or one or more portions thereof) may be sterilized (e.g., disinfected). The sterilization may reduce the possibility of infection to a patient during a surgery or surgical procedure. In some embodiments, a first surface of the sterile drape 138 (which may be or include some or all of the first portion and/or the second portion) may be sterilized and a second surface opposite the first surface may not be sterilized. The first surface may face toward the patient (e.g., be oriented toward the patient, be the surface closest to the patient, be the surface that contacts the patient, etc.) while the second surface may face away from the patient (e.g., be oriented away from the patient, be the surface furthest from the patient, be the surface that contacts a robot, imaging device, surgical tool, or other surgical instrument or surgical device and not the patient, etc.) when the sterile drape 138 is draped over a surgical instrument or surgical device. In such embodiments, the second surface may contact the surgical instrument or surgical device (e.g., a robotic arm holding a surgical tool), while the first surface may face outward from the robotic arm, such that any contact between the sterile drape 138 and the patient (such as when the surgical tool enters patient anatomy) occurs between the patient and the sterilized first surface.

In some embodiments, the amount of shrinkage of the second portion may change depending on the location of the surgical tool or surgical device. The second portion, when shrunk, may conform or substantially conform to continuous surfaces of the surgical tool or surgical device, and may additionally or alternatively only partially conform to surfaces of the surgical tool or surgical device containing sudden changes in curvature (e.g., discontinuous portions of the robot 114), and/or parts of the surgical tool or surgical device requiring flexibility or maneuverability (e.g., joints in a robotic arm and/or areas therebetween, points of attachment between a surgical tool and a robotic arm, etc.).

In some embodiments, the second portion may be configured to shrink to conform or substantially conform to the shape (e.g., outline, curvature, etc.) of the portion of the surgical instrument or device over which the second portion is laid. For example, if the second portion is laid over a portion of the robot 114 and/or components thereof (e.g., robotic arm 116), the second portion may shrink to match the shape of the portion of robot 114 (and/or the robotic arm 116). In some embodiments, the second portion may shrink onto an outer surface (e.g., of a surgical tool or other surgical instrument) when heat is applied. In some embodiments, the second portion may shrink at different rates in different directions and/or to different levels of conformity, depending on how much heat is applied, the original dimensions of the second portion, or the like. In some embodiments, a drape or other covering according to embodiments of the present disclosure may be configured with a plurality of second portions, each configured to shrink in a predetermined manner based on a portion or location of a surgical tool or device over which the particular second portion will be placed. For example, a second portion may be configured shrink onto a marker, lens, or other optical element positioned at or near a distal end (i.e., an end positioned more closely to a patient than to a surgeon) of a surgical instrument with a greater degree of conformity than on a marker, lens, or other optical element positioned at or near a proximal end (i.e., an end positioned more closely to a surgeon than to a patient). In such embodiments, the distal end may require a greater conformity (e.g., a tighter fit) between the distal end and the second portion, whether to withstand greater expected forces acting to pull the drape away from the distal end of the surgical instrument or tool or otherwise.

Unless otherwise specified, "substantially conform" as used herein means that the second portion (1) has substantially the same shape and contour as an underlying surface onto which the second portion of the sterile drape 138 is shrunk, and (2) is free of wrinkles (e.g., ridges and/or furrows in the second portion, areas where the second portion folds onto itself. Alternatively, when so specified, "substantially conform" means that the second portion is shrunk to within 1 mm of an underlying surface, or within 2 mm of an underlying surface, or within 3 mm of an underlying surface, or within 4 mm of an underlying surface, or within 5 mm of an underlying surface. In still other embodiments, when so specified, "substantially conform" may mean that the second portion is shrunk closely enough to an underlying surface that one or more portions of the underlying surface (which may be, for example, a surface of a fiducial marker) may be identifiable, viewable, or can otherwise be distinguished by one or more components of the system 100 (e.g., a navigation system 118). For the avoidance of doubt, each of the foregoing definitions of "substantially conform" can be used in connection with any embodiment described herein within the scope of the present disclosure. In some embodiments, the second portion, when shrunk, may extend at an angle (other than zero degrees) with respect to an underlying surface. For example, the underlying surface may have contours, such as when the underlying surface is a spherical fiducial marker, and the second portion may shrink onto the underlying surface such that a first area of the second portion is flush with the underlying surface while a second area of the second portion is distanced from the underlying surface (e.g., 1 mm, 1.5 mm, 2 mm, 5 mm, etc.).

In some embodiments, the second portion reduces in some dimensions and/or increases in other dimensions when shrinking. For instance, the length, width, and/or thickness of the second portion may be increase or decrease when heat is applied. In one embodiment, the second portion may reduce or shrink in a length and/or a width direction (e.g., directions along a surface of a surgical instrument on which the second portion rests), while increasing or expanding in a thickness direction (e.g., a direction orthogonal to a surface of a surgical instrument). In various embodiments of the present disclosure, the expansion in the thickness direction may increase at different amounts or percentages (e.g., 10%, 20%, 30%, etc.) relative to the original thickness of the second portion. In some embodiments, the second portion may shrink at different rates depending on, for example, material type, amount and rate of heat applied thereto, or the like. In some embodiments, the second portion may have a smaller thickness (e.g., be thinner) than the first portion, such that when the second portion is heated and shrunk, the thickness of the second portion increases and matches the thickness of the first portion, creating a uniform thickness of the sterile drape 138.

Embodiments of the sterile drape 138 may have or be various sizes (e.g., different lengths, widths, and/or thicknesses), may be designed for various surgeries or surgical tasks (e.g., spinal surgeries, laparoscopic procedures, etc.), and may be designed to shrink to fit, form a smooth protective barrier over, or otherwise cover various surgical tools, instruments, and/or components (e.g., an O-arm, a robot and/or robotic arm, one or more components of a navigation system, etc.). In some embodiments, the sterile drape 138 may be specifically manufactured be used in specific surgeries or surgical tasks and/or to be shrunk to conform to specific surgical tools, instruments, and/or components. In such embodiments, the sterile drape 138 may comprise additional or alternative components (e.g., interfaces, markings, labels, stripes, combinations thereof, etc.) which may facilitate the use of the sterile drape 138. For example, the sterile drape 138 may be applied to an O-arm and may include installation instructions and/or labels to assist a user in draping and shrinking the sterile drape 138 onto the O-arm, with a second portion of the sterile drape properly positioned over one or more fiducial markers or other light-sensitive areas of the O-arm. Heat may then be applied to the second portion to cause the second portion to become wrinkle-free, such that light may pass through the second portion undistorted.

In some embodiments, the second portion may comprise or be one or more optical windows. The optical window may be a transparent or semi-transparent material that permits the passage of light therethrough. In some embodiments, the optical window may be embedded in one or more portions (e.g., the second portion) of the sterile drape 138. The optical window may be made from a heat-shrinkable material (e.g., a similar material to or the same material as the second portion) and may be configured to shrink onto or around a surgical instrument or tool when heat is applied. Also in some embodiments, an entirety of the second portion may comprise an optical window, or any heat-shrunk portion of the second portion may become an optical window (e.g., have characteristics suitable for the substantially undistorted transmission of light therethrough).

In some embodiments, the optical window may be configured to align, when the drape or covering is properly installed on a robot 114, with one or more portions of the robot 114 that require light propagation (e.g., a lens in an imaging device attached to the robot 114) and/or require a visual recognition thereof (e.g., a fiducial marker affixed to an outside surface of the robot 114) to function. The alignment of the optical window with such one or more portions of the robotic system enables light to pass through the optical window to allow for visible recognition of components behind the optical window by components of the system 100 (e.g., the imaging device 112, the navigation system 118, etc.) while also allowing the components behind the optical window (e.g., the robot 114 and/or one or more components thereof) to be protected from external detritus (e.g., anatomical tissues or fluids, dirt and debris, etc.) and the patient to be protected from any non-sterile portions of the robot 114. Although described in connection with a robot 114, the present disclosure encompasses application of the foregoing description to the use of a drape or covering with any other surgical instrument or device.

In some embodiments, the second portion may comprise or be a shrink sleeve. The shrink sleeve may be a sleeve positioned to extend around (e.g., wrap about, circumferentially span, etc.) one or more portions of a surgical instrument or device that requires visibility or light (e.g., a lens of the imaging device 112, a fiducial marker on a robot 114, robotic arm 116, or any other surgical device or instrument, etc.). In some embodiments, the shrink sleeve may be transparent, and may be or form (when shrunk) an optical window. For example, the shrink sleeve may wrap or extend around a light-based portion of a device (e.g., a lens, an active marker) and may, when heated, shrink over and/or around the light-based portion of the device to form an optical window through which light may be received by or emitted from the light-based portion of the device without clinically disruptive distortion. In other words, the shrink sleeve, once shrunk, may form an optical window that both enables light transmission through the drape 138 and prevents the drape 138 from slipping off of or otherwise being dislocated from the surgical instrument or surgical tool on which the drape 138 is installed.

In some embodiments of the present disclosure, an optical window may be provided in a non-heat-shrinkable portion of the surgical drape 138 (e.g., in a first portion of the surgical drape 138). In such embodiments, the optical window may be a portion of the drape 138 with light transmission properties suitable for clinical needs. Moreover, the optical window may comprise a semi-rigid material configured to remain wrinkle-free. In such embodiments, the second portion of the drape 138—which may include one or more shrink sleeves configured to be placed over specific protrusions or other portions of a surgical instrument or device— may be heat-shrunk to one or more portions of the surgical instrument or device in a manner that ensures that the optical window remains in place over an imaging device lens, an active fiducial marker, or any other light-based device of the surgical instrument or device. In these embodiments, the heat-shrinkable second portion may not form an optical window (e.g., may not have favorable light transmission properties) when shrunk.

The heating system 140 may be or comprise one or more heat sources (e.g., a heat gun, a heating body such as a heating blanket, a heated ring, heat generated by a surgical tool or device such as a robot, etc.) configured to shrink the sterile drape 138 and/or portions thereof (e.g., the second portion, and optical window, a shrink sleeve, combinations thereof, and/or the like). In at least one embodiment, the heating system 140 may comprise a heated ring, which may be circumferentially adjustable and/or may be mounted around a fiducial marker, lens, or other light-based device and configured to shrink a second portion of a drape 138 proximate thereto when activated. For example, when a surgical drape 138 is placed over a surgical instrument or device, the heated ring may be activated to shrink one or more portions of the surgical drape 138 that are positioned over any light-based elements on the surgical instrument or device. In such embodiments, the heated ring may only locally shrink the sterile drape 138 (e.g., only portions directly contacting the heated ring and/or only portions proximate to the heated ring will receive the heat from the heated ring). In some embodiments, the heated ring may comprise appropriate components so as to be able to apply heat through conduction, radiation, and/or convection.

In at least one embodiment, a heated ring may not be secured to a surgical device or instrument, but may instead be positionable around a portion of the surgical device or instrument after a drape 138 has been positioned on the surgical device or instrument. For instance, an optical window (which may be part of the second portion, and/or formed when the second portion is shrunk) may be aligned such that a fiducial marker affixed to the robotic arm 116 may be seen therethrough by the navigation system 118, which may use the fiducial marker to, for example, register the robotic arm 116 to a patient coordinate space and/or determine a pose of the robotic arm. The sterile drape 138 may be laid over the robotic arm 116, with the first portion of the sterile drape 138 covering a portion of the robotic arm 116. The heated ring may then be slid over the second portion of the drape 138 and the robotic arm 116 and caused to generate heat to shrink the second portion of the drape 138, so as to secure the optical window over the fiducial marker on the robotic arm 116, thus ensuring that the fiducial marker will be visible to a navigation system 118 or other sensor through the drape 138. The heated ring may then be removed (e.g., slid off).

The heating system 140 may be or comprise a heating blanket. The heating blanket may be a flexible sheet comprising conductive material (e.g., metal) embedded in an insulating material (e.g., fleece) and may be configured to shrink one or more portions of the sterile drape 138. The heating blanket may be of similar shape or structure to the sterile drape 138 (or to a second portion thereof), and may have dimensions (e.g., length, width, thickness, etc.) similar to or the same as the dimensions of the sterile drape 138. In some embodiments, the heating blanket may exceed the dimensions of the sterile drape 138 and may be configured to heat the entirety of the sterile drape 138. The heating system 140 is in no way limited to the examples disclosed herein, and any tool or method for applying, generating, or transferring heat may be used to shrink the sterile drape 138 (and/or portions thereof).

The system 100 or similar systems may be used, for example, to carry out one or more aspects of the method 200 described herein. The system 100 or similar systems may also be used for other purposes.

Figure 2:
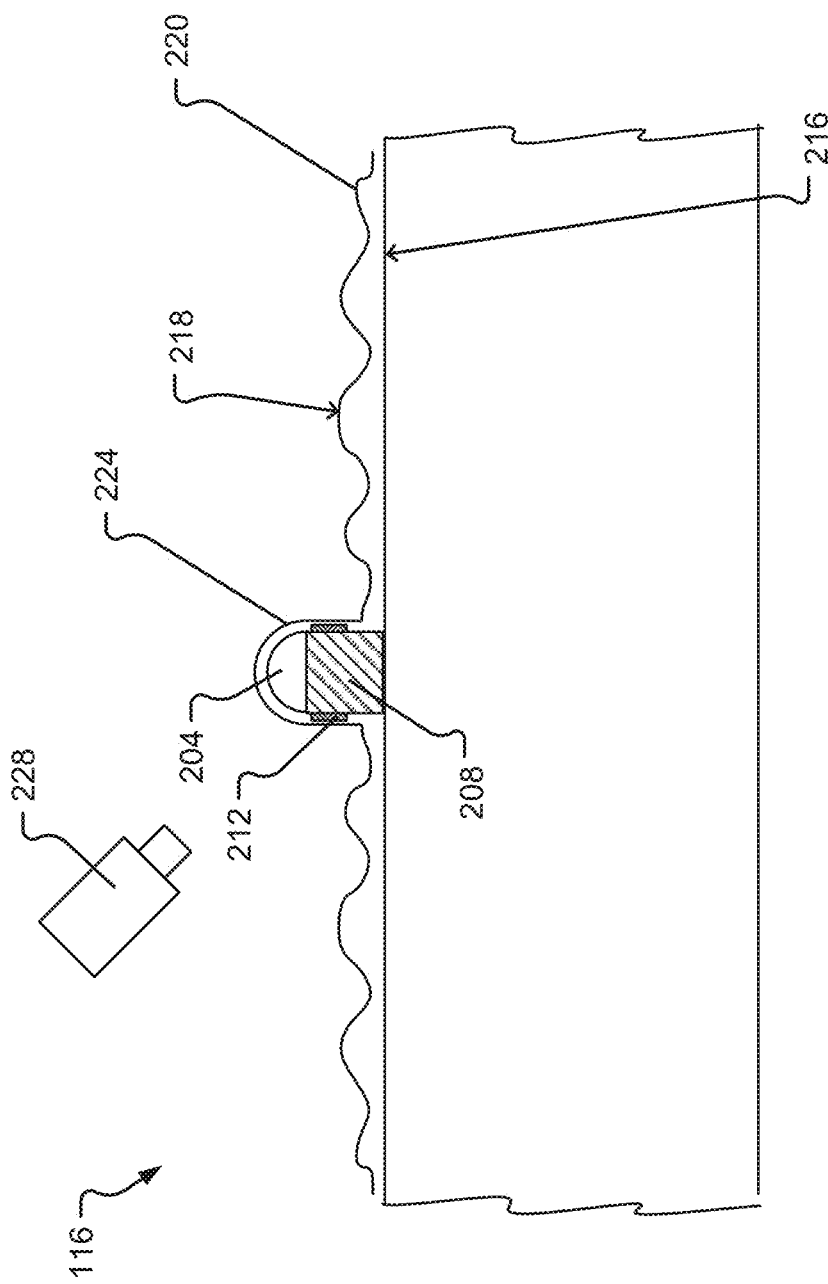
FIG. 2 is a schematic view of a portion of a robotic arm according to at least one embodiment of the present disclosure.

With reference now to FIG. 2, a portion of a robotic arm 116 is shown in accordance with at least one embodiment of the present disclosure. The robotic arm 116 comprises a fiducial marker 204 mounted on a raised stage 208, a heated ring 212, and a sterile drape 218 (which may be the same as or similar to the drape 138 described above), and/or a heat gun 228. The fiducial marker 204 may be an active fiducial marker (e.g., an LED, an IRED, etc.) described herein or any other fiducial marker, and may be used (e.g., by a navigation system 118) to assist in registration and/or navigation (e.g., of the robotic arm 116). The stage 208 elevates the fiducial marker 204 away from the robotic arm 116 (e.g., away from a first surface 216), thus improving visibility thereof. In some embodiments, the stage 208 may hold or secure the fiducial marker in place (e.g., such that the fiducial marker 204 does not move relative to the robotic arm 116 when the robotic arm 116 moves). The heated ring 212 may be similar to or the same as any heated ring discussed herein and may be used to shrink down one or more portions of the sterile drape 218. Although heated rings as described herein may be detachable and configured to slide over both a portion of the drape 218 and the raised stage 208, the heated ring 212 is affixed to the raised stage and configured to heat the sterile drape 218 from underneath the sterile drape 218. The sterile drape 218 and portions thereof (e.g., a first portion 220 and a second portion 224) may be similar to or the same as any sterile drape discussed herein (e.g., a sterile drape 138). The first portion 220 may rest on the surface 216 of the robotic arm 116, and may be heat resistant (e.g., may not shrink when heat is applied). The second portion 224 may be aligned or placed over the fiducial marker 204, and may be configured to shrink (e.g., when the heated ring 212 applies heat) to conform or substantially conform to the fiducial marker 204. As a result of shrinking, the second portion 224 is configured to facilitate non-distorted transmission of light therethrough, thus facilitating detection of the fiducial marker 204 by a navigation system 118 or other sensor even with the drape 218 in place. Additionally or alternatively, the robotic arm 116 may receive heat (e.g., to shrink the second portion 224) from the heat gun 228. The heat gun 228 may be any heat gun described herein or any other device capable of generating and transmitting heat, and may be used to shrink the second portion 224.

Figure 3:
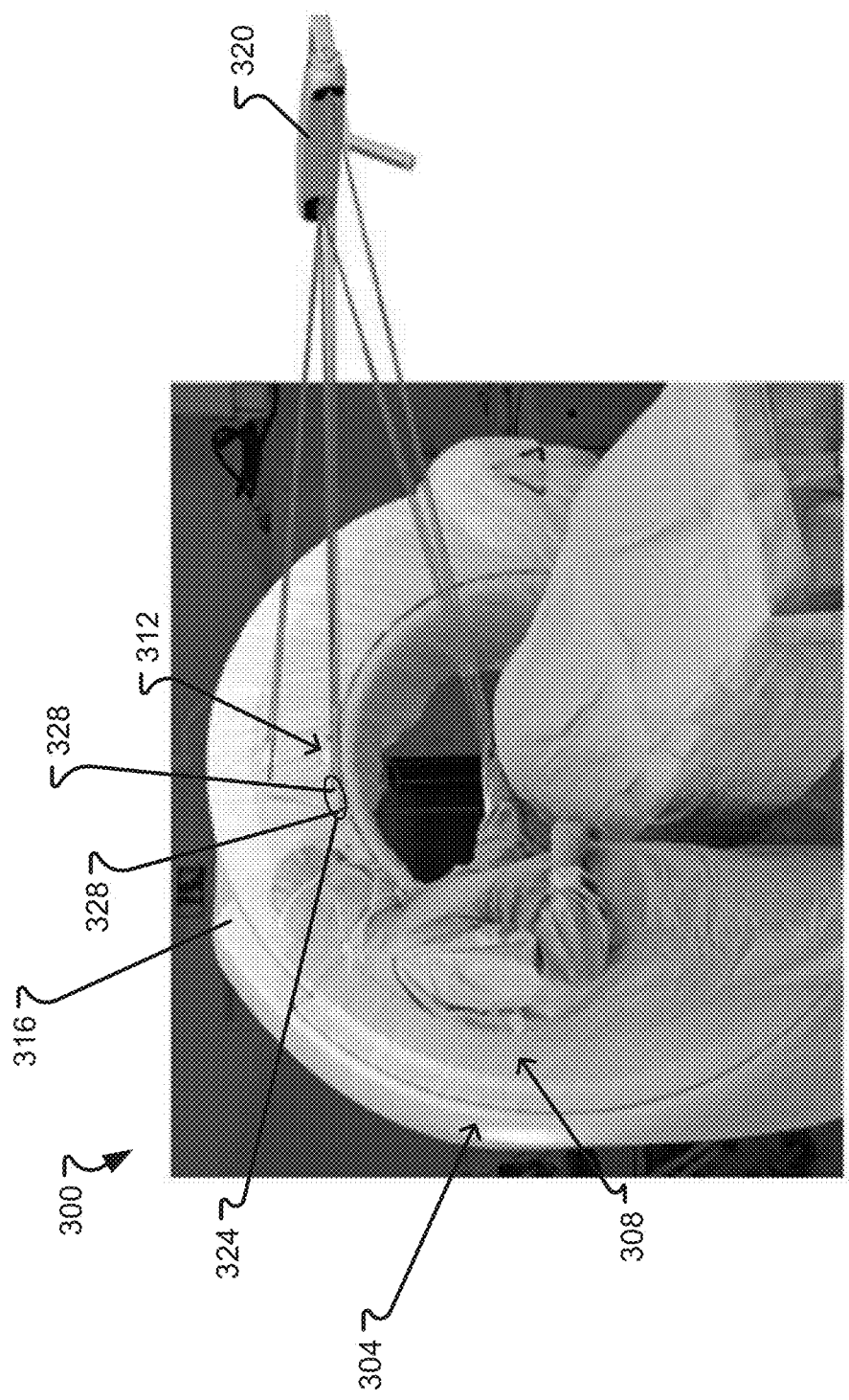
FIG. 3 is a system according to at least one embodiment of the present disclosure.

FIG. 3 depicts a system 300 in accordance with at least one embodiment of the present disclosure. The system 300 and/or components thereof may be similar to or the same as any other system mentioned herein (e.g., a system 100). The system 300 comprises a sterile drape 304 (which in turn comprises a first portion 308 and a second portion 312), an O-arm 316, and a navigation system 320. The sterile drape 304 may be similar to or the same as any sterile drape mentioned herein (e.g., a sterile drape 138, a sterile drape 218, etc.), with the first portion 308 being made of a non-heat-shrinkable material (e.g., a material that does not shrink when heat is applied) and the second portion 312 being made of a heat-shrinkable material (e.g., a material that shrinks when heat is applied). The navigation system 320 may be similar to or the same as a navigation system 118. The O-arm is an imaging device such as the imaging device 112. The O-arm comprises one or more fiducial markers 328. When the second portion 312 (or at least portions thereof positioned over the fiducial markers 328) is shrunk by application of heat thereto, the second portion forms an optical window 324, which is similar to or the same as any optical window discussed herein and facilitates visual recognition of the one or more fiducial markers 328 by the navigation system 320. More specifically, by shrinking the second portion 312 of the drape 304 over the fiducial markers 328 to form an optical window 324, the wrinkles and folds that characterize the first portion 308 of the drape 304, as well as non-shrunken portions of the second portion 312 of the drape 304, do not interfere with light transmission through the drape 304. The entirety of the drape 304, including the optical window 324, provides a protective barrier between the O-arm 316 and a patient during a surgical procedure.

Figure 4:
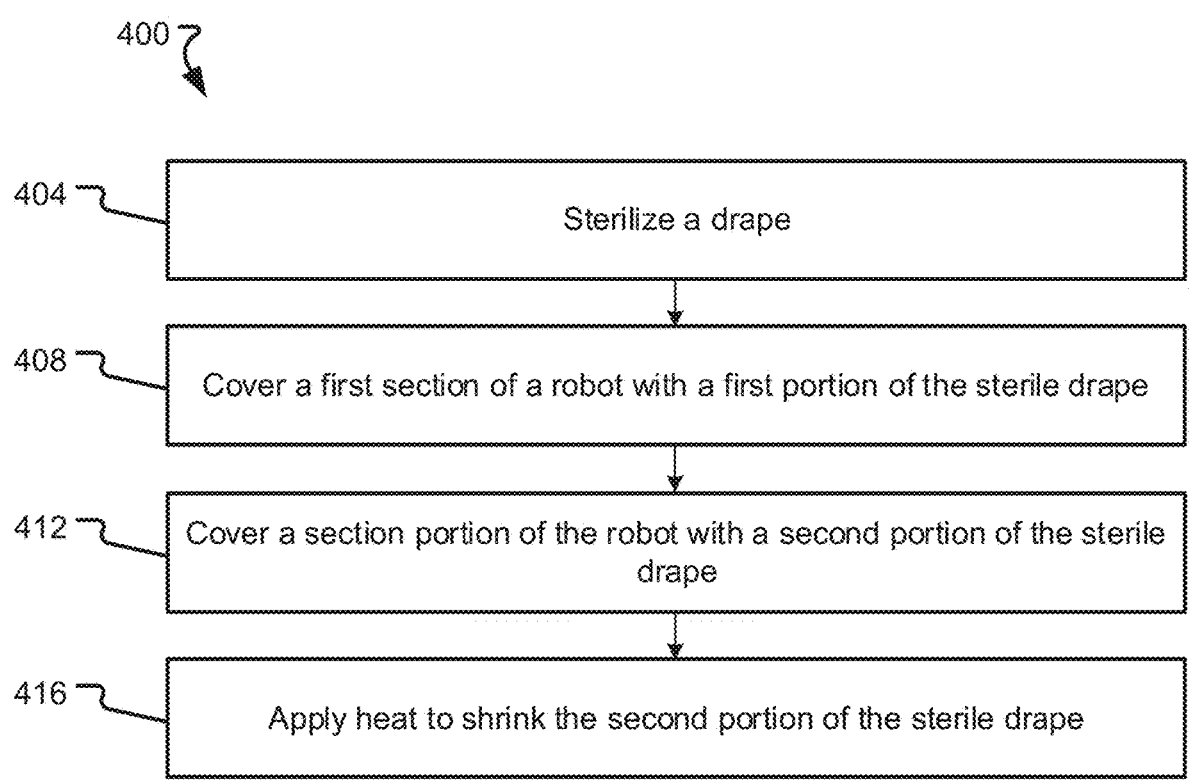
FIG. 4 is a flowchart according to at least one embodiment of the present disclosure.

FIG. 4 depicts a method 400 that may be used, for example, to apply a drape to one or more components of a system (e.g., a system 100). While the method 400 is described with reference to a single drape, multiple drapes may be used for any type of surgery or surgical procedure.

The method 400 comprises sterilizing a drape (step 404). The drape (which may be, for example, a drape 138) may be sterilized using non-heating methods (e.g., using a disinfectant fluid or aerosol, applying an antimicrobial coating thereto, etc.). In some embodiments, only one side of the drape 138 may be sterilized. The sterilization may allow the drape to be used, for example, in surgical environments or other environments that require sterilization and/or antimicrobial conditions. The shrink drape comprises one or more portions configured to shrink when receiving heat. The shrinking portions may allow the drape to be wrapped around or otherwise attached to one or more surgical instruments or tools associated with a surgery or surgical procedure (e.g., as a result of shrinking and thus form-fitting one or more components on the one or more surgical instruments or tools.

The method 400 also comprises covering a first section of a robot or other surgical instrument or device with a first portion of the sterile drape (step 408). The first portion of the sterilized shrink drape (e.g., a sterile drape 138) may be or comprise material resistant to heat (e.g., configured to not shrink when heat is applied thereto). The first portion may be draped over the first section of the robot to protect the robot, for example, from anatomical tissues. In some embodiments, the first portion may be loosely applied to the first section (e.g., the first portion may contain empty space or other areas where the first portion does not physically contact the first section). One or more folds or other wrinkles may be present in the first portion, both before and after the drape is placed over the robot or other device. Any surgical instrument or device, including a surgical robot, an imaging device, a surgical tool, any portion of any of the foregoing, or any other instrument or device may be covered with the first portion of the sterile drape in the step 408.

The method 400 also comprises covering a second section of the robot with a second portion of the sterile drape (step 412). The second section of the robot may, in some embodiments, be a portion of the robot that emits light (e.g., a fiducial marker on the robot) or receives light (e.g., a lens of an imaging device on the robot). In other embodiments, the second section of the robot is not light-based, but corresponds to attachment points for the drape such that, with the drape attached to the attach points, an optical window in the first portion of the drape will be properly positioned over a light-based element of the robot. In some embodiments, the second portion of the sterilized shrink drape (e.g., a sterile drape 138) may be configured to shrink around a surgical instrument or tool, to form a smooth, protective surface therearound with clinically satisfactory light transmission characteristics. For example, the second portion may be a shrink sleeve, which may shrink to secure the sterilized shrink drape to a protrusion (e.g., a fiducial marker positioned on a raised stage). One or more folds or other wrinkles may be present in the second portion upon completion of the step 412. Any surgical instrument or device, including a surgical robot, an imaging device, a surgical tool, any portion of any of the foregoing, or any other instrument or device may be covered with the second portion of the sterile drape in the step 412.

The method 400 also comprises applying heat to shrink the second portion of the sterile drape (step 416). The heat may be applied from a heat source (e.g., a heat gun, a heated ring, etc.) and may shrink the second portion onto a surface of a surgical instrument (e.g., a surface of a robotic arm) such that the sterile drape forms a smooth protective barrier on one or more portions of the surface of the surgical instrument. In some embodiments, the second portion may comprise or be an optical window. The optical window may be transparent or semi-transparent (e.g., permitting the passage of undistorted light therethrough) and may be configured to shrink when receiving heat (e.g., to remove wrinkles therefrom). In at least one embodiment, the optical window may shrink down to cover a visual and/or light sensitive component (e.g., a lens of an imaging device, a fiducial marker, etc.). The optical window may shrink onto the component such that the optical window is affixed to the sensitive component (and/or to the surface of the surgical instrument containing the light sensitive component). In some embodiments, the optical window may remain stationary after shrinking (e.g., the optical window may not move relative to a robotic arm when a robotic arm to which the optical window is attached moves during a surgery or surgical procedure).

The present disclosure encompasses embodiments of the method 200 that comprise more or fewer steps than those described above, and/or one or more steps that are different than the steps described above.

As noted above, the present disclosure encompasses methods with fewer than all of the steps identified in FIG. 2 (and the corresponding description of the method 200), as well as methods that include additional steps beyond those identified in FIG. 2 (and the corresponding description of the method 200). The present disclosure also encompasses methods that comprise one or more steps from one method described herein, and one or more steps from another method described herein. Any correlation described herein may be or comprise a registration or any other correlation.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A shrink sterile drape, comprising:
a first portion;
a second portion configured to shrink relative to the first portion in presence of heat; and
an optical window disposed in the second portion and configured to permit passage of light therethrough, wherein the shrink sterile drape is configured to cover at least a portion of a medical apparatus, and wherein, when the second portion receives heat, the second portion shrinks onto and substantially conforms to a surface of a surgical robot.

2. The shrink sterile drape of claim 1, wherein the surgical robot comprises an O-arm or a robotic arm.

3. The shrink sterile drape of claim 1, wherein the second portion comprises at least one of polyethylene, modified fluorinated ethylene propylene (FEP), oriented polystyrene, and polyolefin.

4. The shrink sterile drape of claim 1, wherein the second portion is configured to shrink in at least one of a length direction and a width direction and expand in a thickness direction when receiving heat.

5. The shrink sterile drape of claim 1, wherein the optical window is configured to shrink in at least one dimension when receiving heat.

6. The shrink sterile drape of claim 1, wherein the medical apparatus comprises an imaging device, and wherein the optical window is aligned with the imaging device such that light received by the imaging device passes through the optical window.

7. The shrink sterile drape of claim 1, wherein a robotic arm comprises at least one marker, and wherein the optical window is aligned with the at least one marker so that the at least one marker is visible through the optical window.

8. The shrink sterile drape of claim 7, wherein at least one marker is disposed on a raised stage of the robotic arm.

9. A system comprising:
a robotic arm; and
a sterilized sheet configured cover at least part of the robotic arm, the sterilized sheet comprising:
a first portion comprising a non-heat-shrinkable material;
a second portion comprising a heat-shrinkable material; and
an optical window disposed in the second portion and configured to permit passage of light therethrough.

10. The system of claim 9, wherein the sterilized sheet covers at least a portion of the robotic arm.

11. The system of claim 10, wherein the optical window is aligned with an imaging device such that light received by the imaging device passes through the optical window.

12. The system of claim 9, wherein the optical window is configured to shrink around an imaging device such that the optical window does not move with respect to the imaging device.

13. The system of claim 9, wherein the second portion comprises at least one of polyethylene, modified fluorinated ethylene propylene (FEP), oriented polystyrene, and polyolefin.

14. The system of claim 9, wherein the robotic arm comprises a heat source configured to apply heat to the second portion.

15. The system of claim 14, wherein the heat source comprises a heated ring.

16. The system of claim 15, wherein the heated ring surrounds at least one of a marker and an imaging device disposed on the robotic arm.

17. A surgical drape comprising:
a first material configured to cover a first portion of a surgical tool; and
a second material configured to cover a second portion of the surgical tool, the second portion comprising a light-based element and the second material is a heat-shrinkable material,
wherein each of the first material and the second material may be chemically sterilized.

18. The surgical drape of claim 17, wherein the light-based element comprises a lens of an imaging device.

19. The surgical drape of claim 17, wherein the light-based element comprises a marker.

20. The surgical drape of claim 17, wherein the second material is configured to provide a smooth, transparent protective barrier over the light-based element following application of heat thereto.

* * * * *